United States Patent [19]

Lindström

[11] 4,017,369

[45] Apr. 12, 1977

[54] METHOD FOR THE ELECTROLYTIC RECOVERY OF SB, AS, HG AND/OR SN

[75] Inventor: Nils Folke Rune Lindström, Skelleftehamn, Sweden

[73] Assignee: Boliden Aktiebolag, Stockholm, Sweden

[22] Filed: May 3, 1976

[21] Appl. No.: 682,337

[30] Foreign Application Priority Data

May 7, 1975 Sweden ............................. 7505336

[52] U.S. Cl. ........................ 204/121; 204/105 R; 75/101 R; 75/121

[51] Int. Cl.$^2$ ...................... C25C 1/14; C25C 1/16; C25C 1/22

[58] Field of Search ................... 75/101 R, 121; 204/105 R, 121

[56] References Cited

UNITED STATES PATENTS

| | | | |
|---|---|---|---|
| 1,501,412 | 7/1924 | Kissock | 204/120 |
| 2,329,816 | 9/1943 | Betterton et al. | 204/121 |
| 2,436,010 | 2/1948 | Lebedeff | 204/120 |
| 3,969,202 | 7/1976 | Albrethsen | 204/105 R |

*Primary Examiner*—R. L. Andrews
*Attorney, Agent, or Firm*—Stevens, Davis, Miller & Mosher

[57] ABSTRACT

The invention relates to a method for selectively leaching at least one of the elements antimony, mercury, arsenic and tin from sulphidic and oxidic materials with alkali sulphide solutions and subsequent electrolytic recovery of the leached elements. The method consists of maintaining the sulphide ion concentration in mol/l multiplied by two and the hydroxyl ion concentration in mol/l at a value of at least 8 and that the quantity of hydroxyl ions is at least in a quantity equimolar to the quantity of sulphide ions. The electrolyses must be effected at an anode current density of more than 1500 A/m2.

5 Claims, No Drawings

METHOD FOR THE ELECTROLYTIC RECOVERY OF SB, AS, HG AND/OR SN

The present invention relates to a method for the electrolytic recovery of metals of the group which in qualitative analytical chemistry are designated the tin group, namely Hg, As, Sb, and Sn. The electrolysis is effected from an alkaline sulphidic solution, which solution is prepared by leaching a starting material which contains sulphides and/or oxides of one or more of said metals forming said group with a solution containing sulphide ions.

It has been found an advantage to leach out said metals with sulphide ions, since in this way complete selectivity is obtained with respect to other metals contained in the starting material with the exception of the alkali metals. The process is particularly suitable when the primary object is to recover one or more metals from the starting material, and is also suitable when the leaching residue contains a recoverable metal which lies outside the tin group, for example, copper. By way of example, it can be mentioned that one prerequisite when working copper concentrates using present-day techniques is that the antimony content of the material is at most 0.5% calculated on the copper content, in order that the electrolytically-produced copper shall fulfil the strict requirements at present placed on such copper. In order that copper concentrates rich in antimony can be utilised at all, it is consequently necessary that the major portion of the antimony content of the copper concentrates is first removed before the material is introduced to a copper smelter.

The cathode reaction for respective metals in the tin group is:

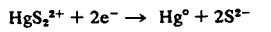
$HgS_2^{2+} + 2e^- \rightarrow Hg^\circ + 2S^{2-}$

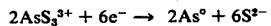
$2AsS_3^{3+} + 6e^- \rightarrow 2As^\circ + 6S^{2-}$

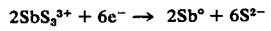
$2SbS_3^{3+} + 6e^- \rightarrow 2Sb^\circ + 6S^{2-}$

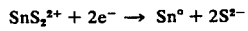
$SnS_2^{2+} + 2e^- \rightarrow Sn^\circ + 2S^{2-}$

With present-day techniques the corresponding anode reaction primarily involves an oxidation of sulphur ions to form elementary sulphur, which, however, is not precipitated onto the anode or out into the main body of the electrolyte, but is dissolved in the strongly sulphidic environment in the form of polysulphide ions. Soluble oxygen-sulphur-ions are also formed.

The following reactions are examples of the anode reactions:

$S^{2-} + 6 OH^- \rightarrow SO_3^{2-} + 3H_2O + 6e^-$

$2S^{2-} + 6 OH^- \rightarrow S_2O_3^{2-} + 3H_2O + 8e^-$

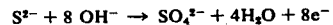
$S^{2-} + 8 OH^- \rightarrow SO_4^{2-} + 4H_2O + 8e^-$

The Sunshine Mining Company, Idaho, USA, have applied industrially a method involving sulphide leaching with subsequent electrolysis (Engineering and Mining Journal 45, pages 54–58 (1944). In this method antimony is leached from copper concentrates using an aqueous solution with sodium sulphide having 250 g $Na_2S$/liter. In order to effect the electrolysis, however, it is necessary to use an electrolyte vessel of particular design, in which the anode and cathode chambers are mutually separated by means of a diaphragm. In this way the polysulphide ions and oxygen-sulphur ions formed at the anode are prevented from migrating to the cathode, where they would be reduced and cause an unacceptable decrease in current yield. According to the aforementioned article, the electrolyte introduced to the cathode chamber will contain 50 g/l Sb and 250 g/l $Na_2S$, and the current density shall be approximately 300 A/m².

Since, in accordance with the aforementioned method, the anode products remain in solution as polysulphide ions and oxygen-sulphur ions, it is necessary to regenerate the solution departing from the electrolysis by precipitating out polysulphide ions and oxygen-sulphur ions with barium sulphide, so that these ions are not enriched in the system so as thereby to quickly reduce its leaching ability. Sulphide ions in solutions are also oxidized in other parts of the liquid system, although to a smaller extent than their oxidation at the anode. The barium sulphide is recovered by reduction of the precipitate with carbon in a separate system.

F. Kadlec and P. Brezany describe in Freiberger Forschunsheft 34 (1959): pages 5–17, a method for leaching antimony and mercury from copper concentrates with subsequent electrolysis of the leaching solution, this method being fairly similar to the aforementioned method, although differing with respect to the manner in which the solution is regenerated. In accordance with this latter method, a suitable quantity of the anolyte is drawn off from a diaphragm cell and evaporated and cooled, whereupon oxygen-sulphur salts crystallise together with sodium sulphide. The precipitate is then reduced with carbon at a temperature of approximately 1000° C, whereby sodium sulphide is recovered. The authors state that the costs of regenerating the sulphide are high.

The electrolysis is carried out substantially with a catholyte composition of the ingoing solution of 50 g/l antimony and 166 g/l sodium sulphide. Sodium hydroxide is added to the anolyte so as to replace sodium losses.

Cvetnye Metally (1968) : 8, page 50 describes a method in which antimony is leached from alkali-sulphide solutions and recovered electrolytically. The article discloses operational data according to which antimony can be recovered electrolytically in cells which have no diaphragm but with which the current yield is smaller than 60%. The authors disclose that tests have been made outside the Soviet Union to increase the current yield by inserting a diaphragm and separating the circulation of anolyte and catholyte, but consider such measures to be relatively inefficient, owing to the increase of the voltage in the bath and the considerable complications which the flow pattern of the solutions involves. Moreover, the necessity of regenerating the electrolyte is not obviated hereby. The electrolysis is effected at a relatively high anodic current density in comparison with the aforedescribed methods, namely a current density of 1500 A/m². The component contents of the circulating electrolyte are, however, relatively low: antimony 25 g/l, sodium hydroxide 30 g/l and sodium sulphide 100 g/l. Similarly to the aforedescribed methods, there takes place with this method an undesirable oxidation of part of the sulphide ions of the solution, these sulphide ions being oxidised to polysulphide, thiosulphate and sulphate, and hence it is necessary to take special precautions against the enrichment of oxidation products. In accordance with one operational example recited in the article, part of the outgoing electrolyte, which, in the main, was freed from antimony electrolytically with an extremely low current yield, smaller than 20–25%, was tapped off, whereafter the residual solution containing 3–5 g/l antimony and sodium sulphide together with a plurality of impurities, was released to a recipient, although this was considered unsuitable from the environmental aspect. The authors of the article therefore suggested an improvement. This improvement, however, merely recommended that the electrolyte tapped off from the system be treated with a soluble iron salt instead of being subjected to electrolysis, whereupon the residual solution became substantially free from antimony and sulphide ions, whereafter the solution was released to a recipient still containing other ions. Other methods for regenerating the electrolyte, such as the method suggested by Sunshine above, were considered by the authors to be complicated and expensive or of poor efficiency.

By way of summary it can be said that none of the aforementioned publications has solved the problems relating to the difficult and expensive regeneration of the solution subsequent to electrolysis. Also, the dilemma remains of choosing between cells which have no diaphragm and which give a low current yield and cells having diaphragms and, although giving high current yields, are expensive and complicated, requiring separate circulation systems for the anolyte and the catholyte.

In accordance with the present invention antimony, tin, arsenic and mercury are leached at high yield (>90%) from material containing sulphides and/or oxides of said substances, whereafter said metals are recovered electrolytically at high current yield (>80%) from alkali sulphide solutions at the same time as the leaching liquid is regenerated without requiring the use of separate precipitation operations. The need of regenerating the solution also eliminates, in accordance with the invention, the need for electrolysis cells which are provided with diaphragms so as to provide a high current yield. The method according to the invention comprises a number of steps, in which it is ensured that the anodic current density exceeds 1500 A/m² at the same time as the ion strength during the electrolysis is of such magnitude that the sum of the sulphide ion concentration in mols/l multiplied by two, and the hydroxyl ion concentration in mols/l is at least 8, and the electrolyte is characterized also by the fact that the ratio between the hydroxyl ion concentration in mol/l and the sulphide ion concentration in mol/l is at least one. At this high ion-strength, hydroxyl-ion content and current density, the total quantity of oxygen-sulphur compounds formed constitutes $SO_4^{2-}$ which, in conjunction with sodium as alkali ions, is present in the form of a saturated sodium solution. Excess sodium sulphate will be precipitated onto the floor of the electrolysis tank and can readily be removed in the form of sludge.

By forming solely sulphate ions in accordance with the present invention, which sulphate ions are directly precipitated out and can readily be removed, the requirement of removing difficultly-separated sulphur compounds is obviated; at the same time an extremely high current yield can be obtained without the use of diaphragms. By difficulty-separated sulphur compounds is meant in this context sulphur-oxide-compounds having a lower oxidation state than six, which renders electrolysis difficult, when the sulphur is completely oxidised to sulphate, no such difficulties occur. The sulphate ions thus formed are namely extremely stable and difficult to reduce, and hence no reactions take place at the cathode which reduce the current yield as a result of the anodic oxidation of sulphide ions.

The particular anode reaction can be represented by the formula:

$$S^{2-} + 8\ OH^- \rightarrow SO_4^{2-} + 4H_2O + 8e^-$$

To prevent the anode film from being depleted of hydroxyl ions, it is ensured in accordance with the invention that the hydroxyl ion concentration of the electrolyte is such that at least one equimolar quantity of hydroxyl ions in relation to sulphide ions is present, which means that the ion ratio $OH^-/S^{2-}$ is at least 1:1. Conveniently this ratio shall lie between 1.5:1 and 6:1 and an ion ratio of about 2:1 is particularly preferred.

The solubility of sodium sulphate in an electrolyte having a composition according to the invention is so slight that the leaching ability of the solution is not reduced. The sulphate obtained, which was found to be without crystal water, is, however, more soluble in the anode film itself than in the remainder of the electrolyte, this being due to the fact that the anode film can be considered as a diluted aqueous solution of sodium hydroxide as will be seen from the above reaction formula. Thus, the sulphate is precipitated in the electrolyte externally of the anode film and will not therefore adhere to the anode.

The temperature at which the electrolysis is effected may be as low as about 50° C, although with the relevant percentages of the electrolyte components, salts other than sodium sulphate begin to crystallise out at temperatures below 50° C, thereby creating problems in practice during the electrolysis. The temperature may be higher than 90° C but, for practical reasons such as vaporisation, heat losses and corrosion, is normally restricted to 150° C.

When the ion ratio $OH^-/S^{2-}$ is increased, the extent to which sodium sulphate is dissolvable in the liquid decreases and therewith the leaching effect of the liquid at the same temperature. The boiling point of the liquid at atmospheric pressure is increased, however, so that leaching can be effected at higher temperatures with a higher ion ratio $OH/S^2$ than can be done at a lower ion ratio. With an ion ratio of 6:1 and 200 g/l of sulphide ions, there is obtained a boiling point of about 190° C, as shown in Example 3 below. For practical reasons, for example with regard to corrosion and vaporisation, leaching is preferred within the temperature range of 150° – 175° C, this being made possible with a leaching solution containing 200 g/l sulphide ions and an ion ratio of 2:1 with a boiling point of about 170° C, as illustrated below in Example 2. In order to maintain the water balance of the system and to ensure that the water formed by the anode reaction and the water added for washing the leaching residue is removed from the system, the electrolyte solution can, in accordance with the invention, be transferred from the electrolysis cell to the leaching stage and there, whilst boiling, be caused to act on the material for a period of time of such duration that the boiling point of the leaching liquid rises from about 120° to 170° C during the leaching process by vaporising the water.

Normally, it is impossible to prevent a small degree of oxidation of the liquid system, owing to the effect of the oxygen in the air in accordance with the formula:

$$2S^{2-} + \tfrac{1}{2}O_2 + H_2O \rightarrow S_2^{2-} + 2 OH^-$$

These oxidation products are reduced at the cathode and therewith lower the cathodic current yield. It has been found possible, however, to eliminate this loss in cathodic current yield by treating the leaching solution, suitably in conjunction with the leaching operation, with a reductant, such as iron in the form of iron chips. Because of the high $OH^-$ concentration and the high leaching temperature, the iron reacts so quickly compared with previously known leaching liquids, that high specific surfaces such as those afforded by powdered iron or sponge iron are not necessary, but that coarser products such as waste chips obtained from iron-working operations can be used. As will be clear from Example 2 below, the cathodic current yield can be raised from 85 to 92% by applying the particular measure. When using sulphidic starting materials, more sulphur is leached out than that which can be oxidised, this sulphur being precipitated out as alkali sulphate.

When the aforementioned reduction of the solution is effected, for example, with iron chips, a simultaneous precipitation of sulphide ions in the form of FeS according to the formula:

$$Fe + S_2^{2-} \rightarrow FeS + S^{2-}$$

takes place.

Thus, the addition of iron chips contributes to reducing the enrichment of sulphide ions in the system.

When leaching sulphidic material, the alkali ions which are lost in the process cycle in the form of precipitated alkali sulphate and incompletely washed-out leaching residue are replaced by adding alkali hydroxide to the system. When in the case of sulphidic material, the flow of sulphur to the process still exceeds the flow of sulphur from the process in the aforementioned manner, a sulphur balance can be obtained in accordance with the invention by consciously oxidising the solution with oxygen-air and applying iron chips to the leaching process.

Particularly when the leaching residue is intended for the production of copper, sulphide ions may be precipitated out to excess by adding oxidised copper powder, such as cement copper. In this way, hydroxy ions are formed in accordance with the formula:

$$Cu_2O + H_2O + S^{2-} \rightarrow Cu_2S + 2OH^-$$

When a sulphur balance has been achieved by means of one of the aforedescribed methods, the hydroxy ions consumed during the anode reaction have also been replaced. This will be seen from the following Gross formula for the process, which, in the case of the leaching of mercury sulphide, is $$4HgS + 8 OH^- \rightarrow SO_4^{2-} + 4H_2O + 3S^{2-} + 4 HgO$$

The conditions during the electrolysis are such that anodes comprising normal anode material, such as iron and lead, give undesirable corrosion products. Other metals such as titanium are passivated. It has been found that nickel and the platina metals are satisfactory anode materials.

The invention will now be illustrated further by means of a number of examples:

EXAMPLE 1

1 kg of copper-iron sulphide having a content of 16.2% Sb and 1.38% Hg both in sulphide form bound with copper in the mineral tetraedrite, and 193 g of cement copper containing 12% oxygen were leached in aqueous solution with 976 g $Na_2S$ (equivalent to the sum of $Na_2S$ and NaOH in Example 2 below) at the maximum boiling point of 120° C of the aqueous solution with reflux cooling for 4 hours. The volume of the solution was then 2.3 l. The leaching degree was 94% with regard to antimony and 93% with regard to mercury.

With this Example leaching was effected in an aqueous solution solely with $Na_2S$ under such conditions as to obtain maximum leaching yield.

This leaching shall be compared with the leaching undertaken in accordance with Examples 2 and 3 which took place at the same time using a leaching liquid according to the invention and with the remaining conditions maximised.

EXAMPLE 2

1 kg of copper-iron sulphide having a content of 16.2% Sb and 1.38% Hg both in sulphide form bound with copper in the mineral tetraedrite, and 139 g of cement copper containing 12% oxygen were leached with 488 g of $Na_2S$ and 500 g of NaOH, corresponding to a mol ratio of 1:2 with reflux cooling for 4 hours at the solution boiling point of 170° C. The volume of the solution was 1.4 l. The leaching degree was 97% with respect to both antimony and mercury. The leaching solution was separated from the residue. The leaching solution was then admixed with sodium hydroxide corresponding to a sodium sulphate formation and the sodium which, owing to inefficient washing, remained in the leaching residue, whereafter the leaching solution was diluted with washing water obtained from the filtered leaching residue to a solution having a volume of 2.3 l and a boiling point of 120° C, and was electrolysed in a cell which had no diaphragm. The ingoing electrolyte contained 70 g/l antimony. The outgoing electrolyte contained 20 g/l antimony, 210 g/l sodium sulphide and 250 g/l sodium hydroxide. The cathode was made of iron and the current density thereon was 400 A/m². The anode had the form of a grid of vertically-extending nickel wire presenting a surface such that the anodic current density was ten times greater than the cathodic current density or 4000 A/m². The temperature of the electrolysis was 75° C. Hg contaminated with Sb was first precipitated out on the cathode. As the Hg content of the solution decreased and approached zero, the percentage of antimony in the cathode precipitation increased so that finally the cathode precipitation was pure antimony. The cathodic current yield was 85% with respect to the total quantity of precipitated metal. Around the nickel anode wires was precipitated a white salt comprising solely water-free $Na_2SO_4$. This sank successively to the bottom of the cell. Initially the electrolyte was coloured a slight brown by polysulphides, but cleared during the electrolysis. With respect to the formation of sulphate, the anodic current yield was 99%.

The outgoing electrolyte could be used to leach concentrates in quantities corresponding to the quantity of cathodically-precipitated metal with the same good yield as that initially obtained.

The electrolysis and leaching operations were repeated a further five times. By replacing part of the cement copper with iron chips, it was possible to effect the subsequent electrolysis to a cathodic current yield of 90 – 95%, this being possible owing to the fact that the sulphur oxidation products formed were reduced by air-oxidation. The anodic current yield was also 90 – 95%.

EXAMPLE 3

1 kg of concentrates and 139 g of cement copper both having the same composition as that recited in Example 2, were leached with 488 g of $Na_2S$ and 1500 g of NaOH corresponding to a mol ratio of $Na_2S$:-6NaOH at the boiling point, 190° C, of the solution, and also with reflux cooling. In this instance the solution had the volume of 2.6 l. The leaching degree was 96% in respect of Sb and 95% in respect of Hg. Subsequent to adding sodium hydroxide to replace the sodium losses and diluting to 4.6 l, the solution was electrolysed substantially in accordance with conditions recited in Example 2. The ingoing electrolyte contained 35 g/l antimony and the outgoing electrolyte contained 10 g/l Sb, 105 g/l $Na_2S$ and 325 g/l NaOH.

The anodic current density, however, was lower than that in Example 2, namely 2000 $A/m^2$. Prior to the electrolysis all mercury had been cemented out with antimony powder to a mercury-antimony-metal mixture having an antimony-mercury ratio of 1:1. The cathode precipitate comprised pure antimony with traces of arsenic.

The cathodic current yield was 83%. The anodic reactions and current yield were the same as that recited in Example 2, i.e. 99%.

The outgoing electrolyte could be used to leach concentrates in a quantity corresponding to the quantity of cathodically-precipitated metal with the same good yield as that initially obtained.

The electrolysis and leaching operations were repeated a further five times. By replacing part of the cement-copper with iron chips, the subsequent electrolysis could be effected to a cathodic current yield of 90 – 95%, this being possible due to the fact that sulphur oxidation products formed were reduced by air-oxidation. The anodic current yield was also 90 – 95%.

I claim:
1. A method for selectively leaching at least one element from the group comprising antimony, mercury, arsenic and tin from sulphidic and oxidic materials with alkali sulphide solutions with subsequent electrolytic recovery of the leached elements, comprising maintaining in the electrolyte a concentration of sulphide ions and hydroxyl ions, so that the sum of the sulphide ion concentration in mol/l multiplied by two and the hydroxyl ion concentration in mol/l is at least 8, the electrolyte containing hydroxyl ions at least in a quantity equimolar to the sulphide ions, and effecting the electrolysis at an anode current density of more than 1500 $A/m^2$.

2. A method according to claim 1, wherein the electrolysis is effected at a temprature of between 50° and 150° C.

3. A method according to claim 2, wherein the temperature is maintained between 60° and 90° C.

4. A method according to claim 1, wherein the sum of the sulphide ion concentration in mol/l multiplied by two and the hydroxyl ion concentration in mol/l is 10 – 12.

5. A method according to claim 1, wherein the leaching is effected at a temperature of between 110° and 190° C.

* * * * *